United States Patent
Ogura

(10) Patent No.: US 7,397,736 B2
(45) Date of Patent: Jul. 8, 2008

(54) OPTICAL DISC DEVICE AND TRACKING CONTROLLING METHOD THEREFOR

(75) Inventor: Masanori Ogura, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 508 days.

(21) Appl. No.: 11/079,233

(22) Filed: Mar. 15, 2005

(65) Prior Publication Data

US 2005/0207291 A1   Sep. 22, 2005

(30) Foreign Application Priority Data

Mar. 16, 2004   (JP) ............................. 2004-074629

(51) Int. Cl.
*G11B 7/00* (2006.01)
(52) U.S. Cl. .............. 369/44.28; 369/44.34; 369/44.29; 369/44.41; 369/124.12; 369/124.15
(58) Field of Classification Search .............. 369/44.29, 369/44.32
See application file for complete search history.

(56) References Cited

U.S. PATENT DOCUMENTS

| | | | | |
|---|---|---|---|---|
| 4,408,314 A | * | 10/1983 | Yokota | ..................... 369/44.29 |
| 5,291,467 A | * | 3/1994 | Ishiwata et al. | .......... 369/44.28 |
| 5,859,816 A | | 1/1999 | Yamamoto | |
| 6,606,286 B1 | | 8/2003 | Maekawa | |
| 6,826,136 B1 | * | 11/2004 | Jeong | ....................... 369/47.44 |
| 7,215,632 B2 | * | 5/2007 | Horibe | .................. 369/124.11 |
| 2002/0126591 A1 | * | 9/2002 | Takamine et al. | ......... 369/44.34 |
| 2003/0002404 A1 | * | 1/2003 | Maekawa | ................ 369/44.28 |

FOREIGN PATENT DOCUMENTS

| | | |
|---|---|---|
| JP | S63-291223 A | 11/1988 |
| JP | 11-213412 A | 8/1999 |
| KR | 10-0291558 B1 | 6/2002 |

* cited by examiner

*Primary Examiner*—Muhammad Edun
(74) *Attorney, Agent, or Firm*—Sughrue Mion, PLLC

(57) ABSTRACT

Disclosed is an apparatus which includes a tracking error detection circuit, for detecting tracking error signal from outputs of a photodetector, a peak/bottom detection circuit for detecting peak and bottom values of the tracking error signal, a difference circuit for finding the difference between a peak value and a bottom value, and a comparator for comparing an output of the difference circuit with a preset reference voltage VR to output a tracking-off signal based on the result of comparison. The comparator outputs the tracking-off signal, indicating the tracking-off of the light beam spot with respect to a track.

8 Claims, 7 Drawing Sheets

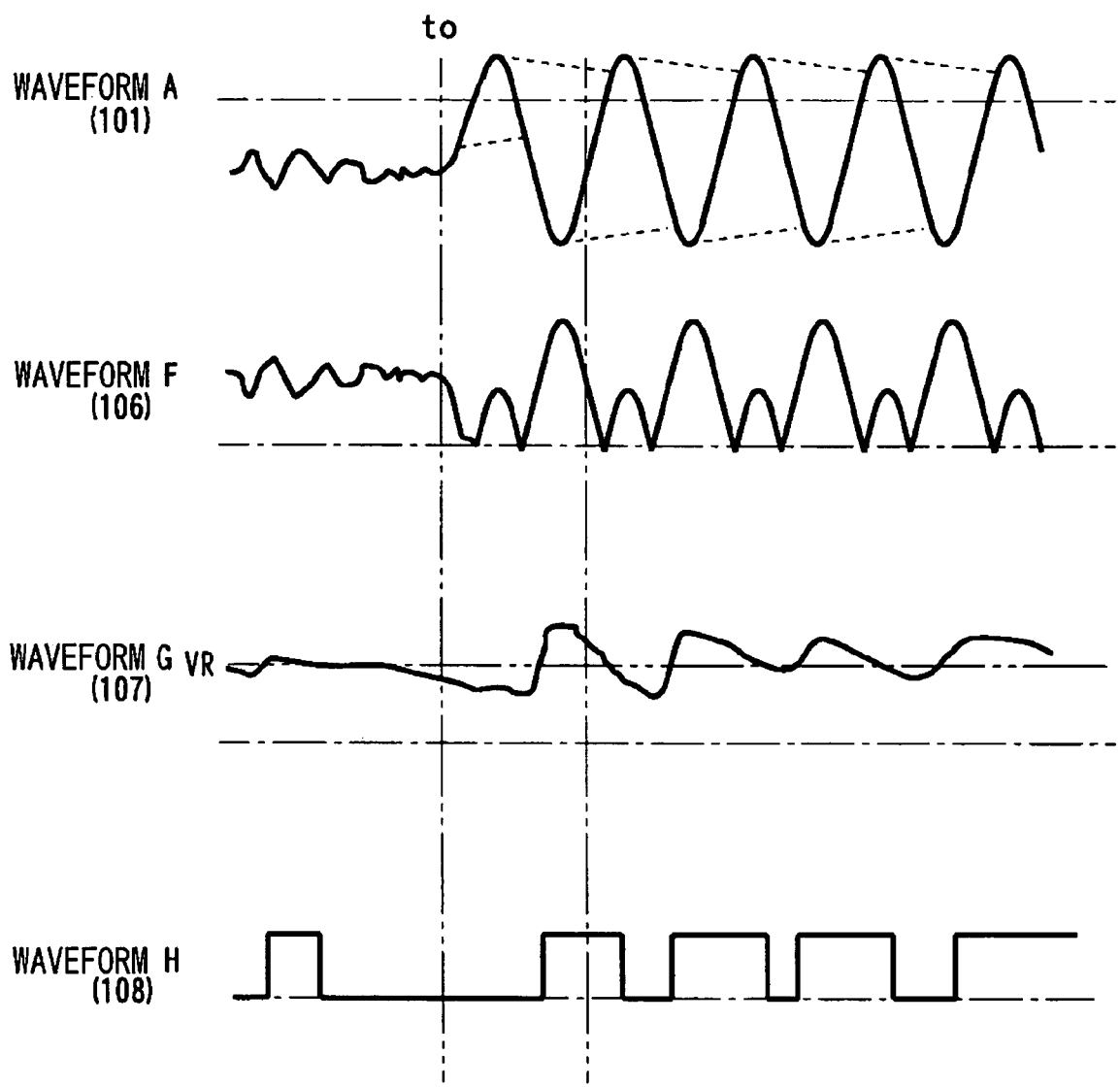

OPTICAL DISC DEVICE AND TRACKING CONTROLLING METHOD THEREFOR

FIELD OF THE INVENTION

This invention relates to an optical disc and, more particularly, to a control technique for managing tracking control.

BACKGROUND OF THE INVENTION

In an optical disc device, tracking servo is carried out for correcting the position of a light beam, based on a tracking error signal indicating the position deviation between the light beam and a recording track, arranged spirally or concentrically on the optical disc, as an optical information storage medium, so that the light beam, illuminated from an optical pickup, will follow a target track at all times.

Up to now, a tracking-off is generally detected by a method consisting in detecting that the level of a tracking error signal indicating the position deviation between the light beam and a track has exceeded a preset positive or negative value.

FIG. 5 shows a typical illustrative structure of a tracking-off detection circuit. Referring to FIG. 5, the tracking-off detection circuit includes a tracking error detection circuit 2, a tracking actuator 4, a tracking servo circuit 3, receiving the tracking error signal from the tracking error detection circuit 2 to control the tracking actuator 4, and a comparator 7 for comparing the voltage of the tracking error signal output from the tracking error detection circuit 2 with a reference voltage VR. The tracking error detection circuit 2 detects a tracking error from two outputs 109 and 110 of a photodetector 1 which detects the reflected light of a light beam illuminated on the optical disc, not shown, to output the resultant tracking error signal. An output of the comparator 7 is a tracking-off signal. The tracking servo circuit 3 receives the tracking error signal, output from the tracking error detection circuit 2, to control the tracking actuator 4. The tracking servo circuit 3 receives the tracking error signal, output from the tracking error detection circuit 2, and actuates the tracking actuator 4 such as to decrease position deviation between a light spot and the track to correct the light spot position.

When a light beam is illuminated from the optical pickup, not shown, there is produced a difference between the light intensity of the reflected light on the left side and that on the right side of the track direction. By capturing this difference in light intensities by the photodetector 1 which comprises at least two separate photodetector elements, not shown, which are provided on left and right sides, it is possible to detect a position deviation signal, that is, tracking error signal 101, of the light beam with respect to the track center, from the respective two outputs 109 and 110 of the two photodetector elements of the photodetector 1. That is, the tracking error detection circuit 2 outputs the difference signal of the output signals 109 and 110, corresponding to the light intensities of the left and right photodetector elements, not shown, of the photodetector 1, as the tracking error signal 101. For example, in the case of a four division optical sensor system, TE=Q+R−(P+S) is found from outputs P, Q, R and S of the four photodetector elements of the photodetector 1 to output TE as a tracking error signal 101. It is noted that the four photodetector elements of the photodetector 1 output Q, R, S and P counterclockwise, with Q and R being for the left side and S and P being for the right side. In the case illustrated, the signals 109 and 110 are (Q+R) and (P+S), respectively.

The tracking actuator 104 of FIG. 5 is configured for causing movement of an objective lens, not shown, of the optical pickup, also not shown, along the left and right directions with respect to a track. Specifically, the light spot is moved by causing movement of the objective lens. With the optical pickup, not shown, an outgoing light beam of a semiconductor laser is collimated by a collimator lens, and the so collimated light beam is focused on an optical disc via a polarizing beam splitter, a 45°-mirror, a quarter wave plate and an objective lens, with a reflected light beam being returned to the polarizing beam splitter and entered via 45° mirror to the photodetector 1.

During the normal operation, tracking may be achieved by a tracking servo loop. There are occasions where a tracking-off is caused due to disturbances in the tracking error signal caused in turn e.g. by vibrations or signal dropout on the disc. In a well-known manner, such a tracking-off may give rise to information recording and/or replaying for a mistaken track.

On the other hand, if a tracking-off is left unattended, tracking servo runaway may be produced. If once the tracking servo runaway should occur due to a tracking-off, there are occasion where, due to heating of the tracking actuator 4, it may take prolonged-standby time until the power supply of the optical disc device may again be turned on after the power supply is turned off.

Thus, in case of a tracking-off, it is necessary to stop the recording and/or replaying operation promptly to return to the former track. For managing such control, it is necessary to detect a tracking-off promptly and accurately.

In the configuration in which the signal level of the tracking error signal exceeds a preset value (reference voltage VR), as shown in FIG. 5, there are occasions where the normal operation free of a tracking-off is erroneously determined to be a tracking-off, due to noise superposed on the tracking error signal, such that the normal operation is unnecessarily interrupted.

For suppressing the noises or disturbances, such a method consisting in passing tracking error signal through a low-pass filter may be used. In this method, the tracking error signal 101, output from the tracking error detection circuit 2 of FIG. 5, is input to a low-pass filter, not shown, for smoothing. The resulting signal is compared by the comparator 7 with the reference voltage VR and, if the output voltage of the low-pass filter is larger than the reference voltage VR, it is determined that a tracking-off has occurred. Although high frequency noises or disturbances may be suppressed by the low-pass filter, high-frequency components of the tracking error signal are suppressed simultaneously. The result is that, in case a laser beam traverses a large number of tracks speedily under e.g. a tracking-off, the tracking error signal, varied speedily, are suppressed, with the consequence that a tracking-off cannot be detected correctly.

By the above reason, it is not possible to use a low-pass filter capable of reliably suppressing the noises or disturbances superposed on tracking error signal.

Hence, the configuration suffers from a problem that erroneous detection of a tracking-off by the noise or disturbances cannot be prohibited completely.

There is also known a configuration in which the tracking error signal is rectified by a rectifier circuit 8 and subsequently passed through a low-pass filter 9 so as to be then compared with the reference voltage VR to detect the tracking-off (see, for example the Patent Document 1).

[Patent Document 1]
JP Patent Kokai Publication JP-A-63-291223 (pages 3 and 4 and FIG. 1)

SUMMARY OF THE DISCLOSURE

The problems of the prior-art circuit configuration, shown in FIG. 6, are now explained. FIG. 7, prepared based on the result of research by the present inventor, shows a typical operating waveform of a tracking-off detection circuit shown in FIG. 6. In FIG. 7, a waveform A stands for an output signal 101 of the tracking error detection circuit 2, a waveform F stands for a voltage waveform of an output signal 106 of a rectifier circuit 8, a waveform G stands for an output signal 107 of a low-pass filter 9, and a waveform H stands for a voltage waveform of an output signal 108 of the comparator 7. Referring to the waveform A shown in FIG. 7, in case a negative DC offset component is contained in the tracking error signal 101, there are occasions where the waveform G of the signal, rectified by the rectifier circuit 8 and passed through the low-pass filter 9, becomes lower than the reference voltage VR. In such state, the tracking-off detection circuit is unable to detect the tracking-off correctly, even though the tracking-off has actually been produced. More specifically, the peak value of the waveform A becomes lower than the reference voltage VR, following the rectification and smoothing, such that, in the comparator 7, the tracking-off detection signal 108 (waveform H), corresponding to the peak of the waveform A, is at a low level.

The problems inherent in the above-described conventional tracking-off detection circuit may be summarized as follows:

(A) In the configuration carrying out direct voltage comparison for the tracking error signal (see FIG. 5), tracking errors may be erroneously detected, as a result of track defect or the noise superposed on the tracking error signal, despite the fact that, in actuality, no tracking-off has occurred.

(B) In the configuration carrying out voltage comparison after passing the tracking error signal through a low-pass filter, the high frequency components of the tracking error signal themselves are also suppressed, so that, if the light beam has to traverse a large number of tracks at a high speed, as a result of a tracking-off, the tracking error signal, varied at a high speed, are suppressed, with the consequence that the tracking-off cannot be detected correctly.

(C) In the configuration rectifying the tracking error signal, passing the so rectified signals through a low-pass filter and comparing the resulting signal with the reference voltage to detect the a tracking-off (see FIG. 6), the signal rectified and passed through the low-pass filter is of a lower voltage than the reference voltage, despite the fact that a tracking-off has actually occurred, in case a negative offset, for example, is added to the tracking error signal, with the consequence that the tracking-off again cannot be detected correctly.

The invention disclosed in the present application is so adapted to find a difference signal between the peak and the bottom values of tracking error signal to compare the signal level of the difference signal with that of a reference voltage to detect a tracking-off.

In accordance with one aspect of the present invention, there is provided a optical disc device configured for managing tracking position control of a light beam spot with respect to a recording track, arranged concentrically or spirally on an optical disc as an optical information recording medium for recording and/or replaying the information. The optical disc apparatus comprises a tracking error detection circuit for detecting tracking error signal indicating a position error of the light beam spot with respect to the recording track, a detection circuit for detecting a peak and a bottom of the tracking error signal output from the tracking error detection circuit, a difference circuit for finding the difference between the peak and the bottom signals of the detection circuit, and a comparator for comparing an output level of the difference circuit with a preset reference voltage VR to output a tracking-off signal based on the result of comparison. The comparator outputs the aforementioned off-track-center signal, indicating the tracking-off of the light beam spot with respect to the recording track, in case of the output level of the difference circuit exceeding the aforementioned reference voltage. Meanwhile, the reference numerals in parentheses are, after all, intended for facilitating the understanding of the present invention, and are not to be construed as limiting the invention.

The optical disc according to the present invention may comprise a tracking actuator for driving-controlling the position of the light beam spot with respect to the recording track, a tracking servo circuit supplied with the tracking error signal output from the tracking error detection circuit to control the driving of the tracking actuator based on the tracking error signal. The optical disc apparatus may further comprise a monitor circuit for monitoring the tracking-off signal and for managing control for halting the tracking actuator by the tracking servo circuit in case of detection of an activated state of the tracking-off signal continuing for a preset time.

In a further aspect of the present invention, the tracking controlling method for an optical disc apparatus may further comprise the steps of finding the difference between a peak value and a bottom value of the tracking error signal from tracking error signal indicating a position error of a light beam spot focused on an optical disc with respect to a track, and comparing a difference signal between the peak and the bottom values with a preset reference value to detect a tracking-off based on the results of comparison.

In a further aspect of the present invention, the tracking controlling method for an optical disc apparatus may further comprise the step of managing control for halting the tracking servo control in case of the tracking-off continuing for a preset time duration.

The meritorious effects of the present invention are summarized as follows.

According to the present invention, it is possible not only to avoid erroneous detection of a tracking-off, otherwise caused by noise or disturbances superposed on the tracking error signal, but also to correctly detect a tracking-off even in case an offset component is contained in the tracking error signal.

According to the present invention, tracking servo control is discontinued in case a tracking-off persists for a preset time to contribute to safety and long useful life of the apparatus.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 7 shows an example of an operating waveform of a conventional a tracking-off detection circuit.

PREFERRED EMBODIMENTS OF THE INVENTION

Figure 1:
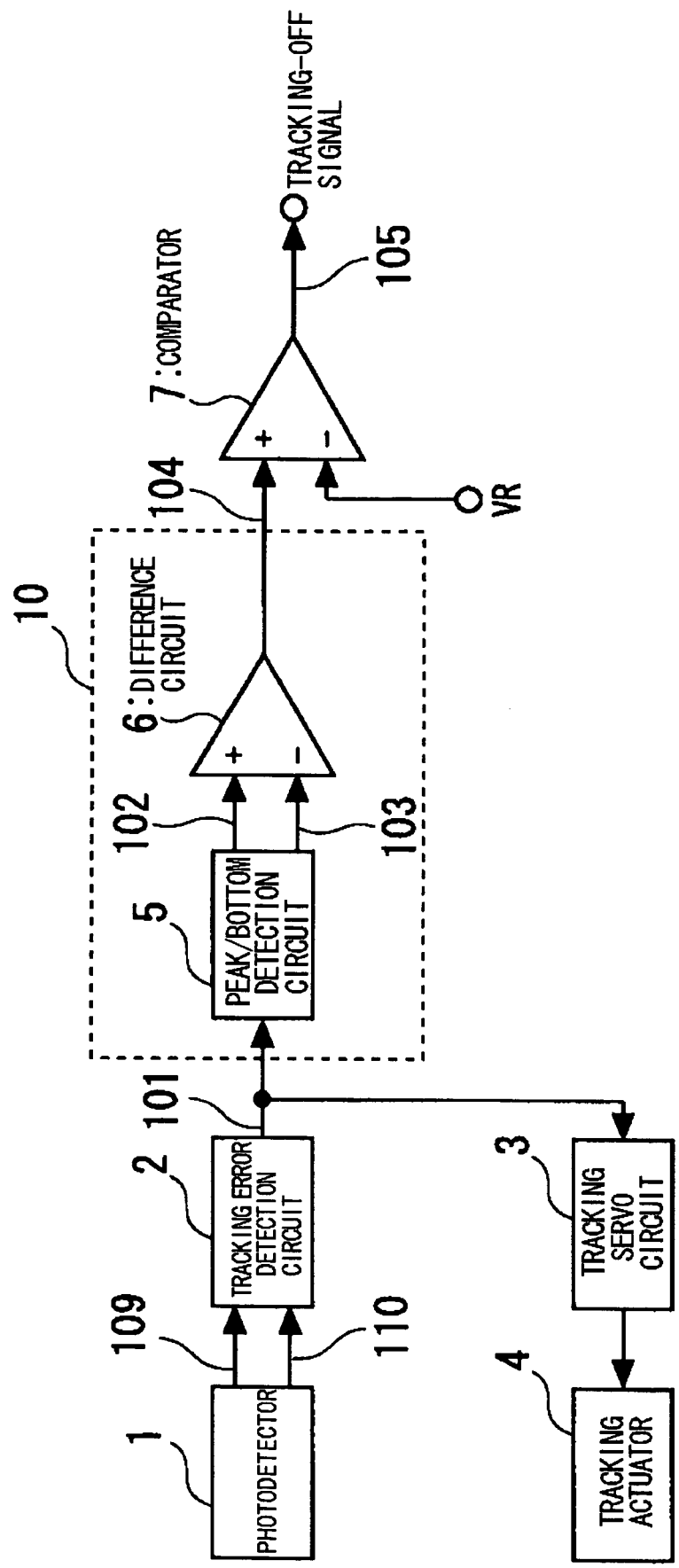
FIG. 1 is a diagram showing the configuration of an embodiment of the present invention.
Figure 5:
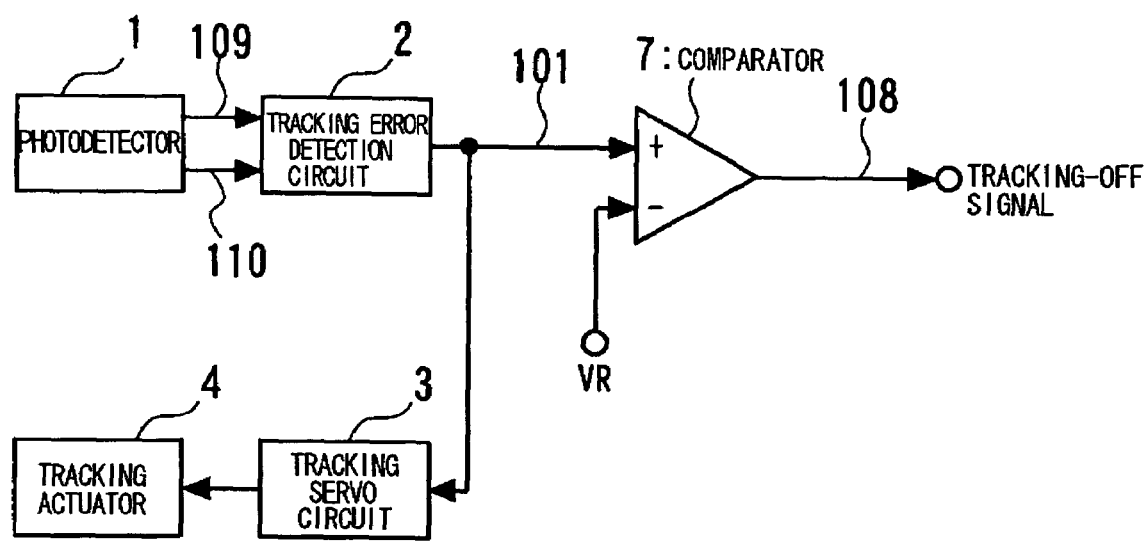
FIG. 5 is a diagram showing the configuration of a conventional a tracking-off detection circuit.
Figure 6:
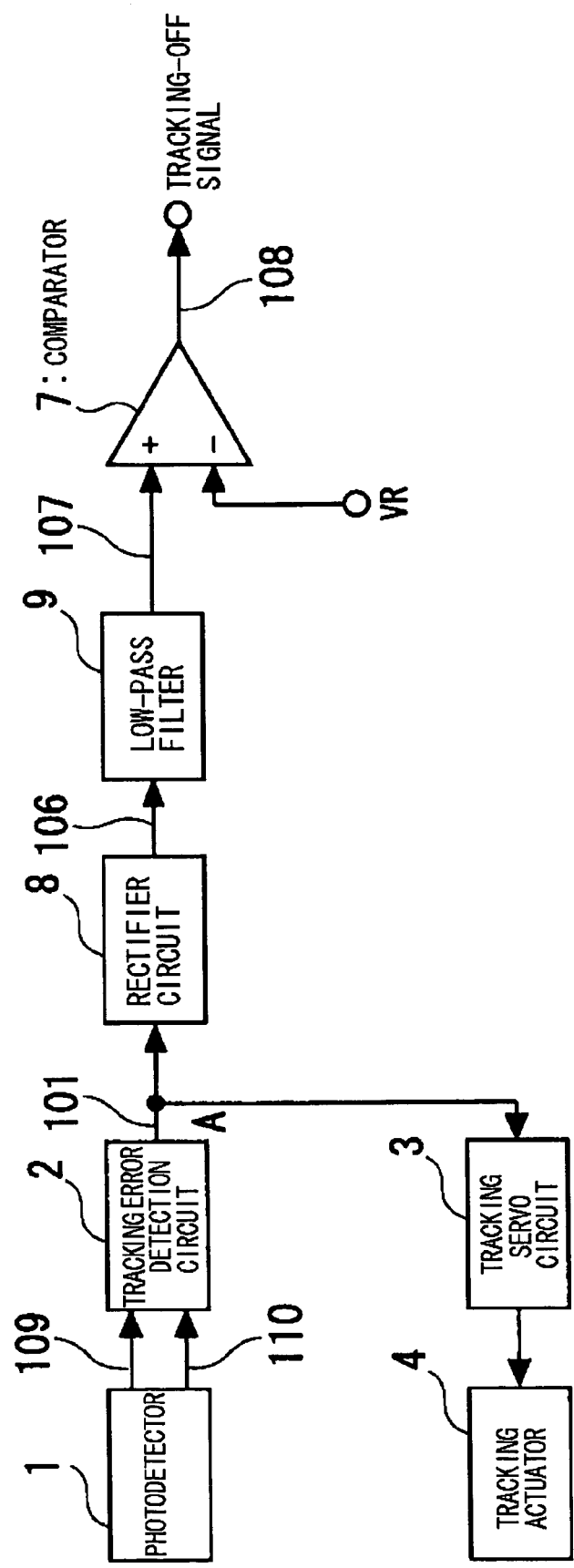
FIG. 6 is a diagram showing the configuration of a conventional a tracking-off detection circuit.

The embodiment of the present invention is hereinafter described. FIG. 1 depicts the configuration of a tracking-off detection apparatus according to an embodiment of the present invention. In distinction from the configuration shown in FIG. 5, the embodiment of the present invention, shown in FIG. 1, includes, in a preceding stage of the comparator 7, a peak/bottom difference detection circuit 10 configured for finding a difference signal between a peak value and a bottom value of the tracking error signal 101.

When a light beam is illuminated from an optical pickup, not shown, on a recording track, formed concentrically or spirally on an optical disc, not shown, operating as an optical information recording medium, there is produced a difference in light intensity of the reflected light beam on the left and right sides of the track direction. This difference in the light intensities may be captured by at least two photodetector elements of the photodetector 1, arranged separated on the left and right sides, to detect position deviation signals of the light beam from the track center, that is, tracking error signal.

In the present embodiment, described above, the tracking error detection circuit 2 outputs the difference signal of output signals 109 and 110, corresponding to the left and right light intensities from the photodetector 1, that is, tracking error signal 101. In the case of e.g. a four-segment photodetector system, the tracking error detection circuit 2 calculates (Q+R)−(P+S), from output signals Q, R and output signals P, S of the left side photodetector elements and the right side photodetector elements, respectively, out of the four photodetector elements of the photodetector 1, not shown, as described above, in order to output the tracking error signal 101. In FIG. 1, the signals 109 and 110 correspond to (Q+R) and (P+S), respectively.

The tracking error signal 101 is supplied to the tracking servo circuit 3. Based on the tracking error signal 101, the tracking actuator 4 is actuated to correct the light beam position for decreasing the position deviation between the light beam and the track.

In the present embodiment, the light beam is able to follow up with track position variations, to an extremely high accuracy, by the above-described tracking servo loop, such as to suppress the position deviation between the light beam spot and the track, that is, the tracking error, to a smaller value. However, a tracking-off may be produced due to disturbances ascribable to vibrations, disturbances of the tracking error signal 101 due to signal dropout on the disc 1, or unusual servo operations. In such case, a tracking-off needs to be detected promptly. In the present embodiment, the following configuration is used for detecting the tracking-off.

Referring to FIG. 1, showing the present embodiment, the tracking error signal 101 is supplied to a tracking servo circuit 3 and to a peak/bottom detection circuit 5. The peak/bottom detection circuit 5 detects a peak value 102 and a bottom value 103 of the tracking error signal. The peak value 102 and the bottom value 103 are sent to a difference circuit 6, made up by a differential circuit.

The difference circuit 6 is differentially supplied with the peak value 102 (Vpeak) and the bottom value 103 (Vbottom) of the tracking error signal 101 to output a difference therebetween (Vpeak−Vbottom). An output signal 104 of the difference circuit 6 is supplied to the comparator 7. The comparator 7 compares the voltage of the output signal 104 of the difference circuit 6 with a preset reference voltage VR, corresponding to a threshold value for a tracking-off, and outputs a tracking-off signal 105 in case the level of the output signal 104 exceeds the reference voltage VR.

In the present embodiment, the tracking-off signal 105, detected as described above, correctly indicates the state of tracking-off. Hence, the recovery processing to the tracking-off may be carried out by employing the tracking-off signal 105.

Figure 2:
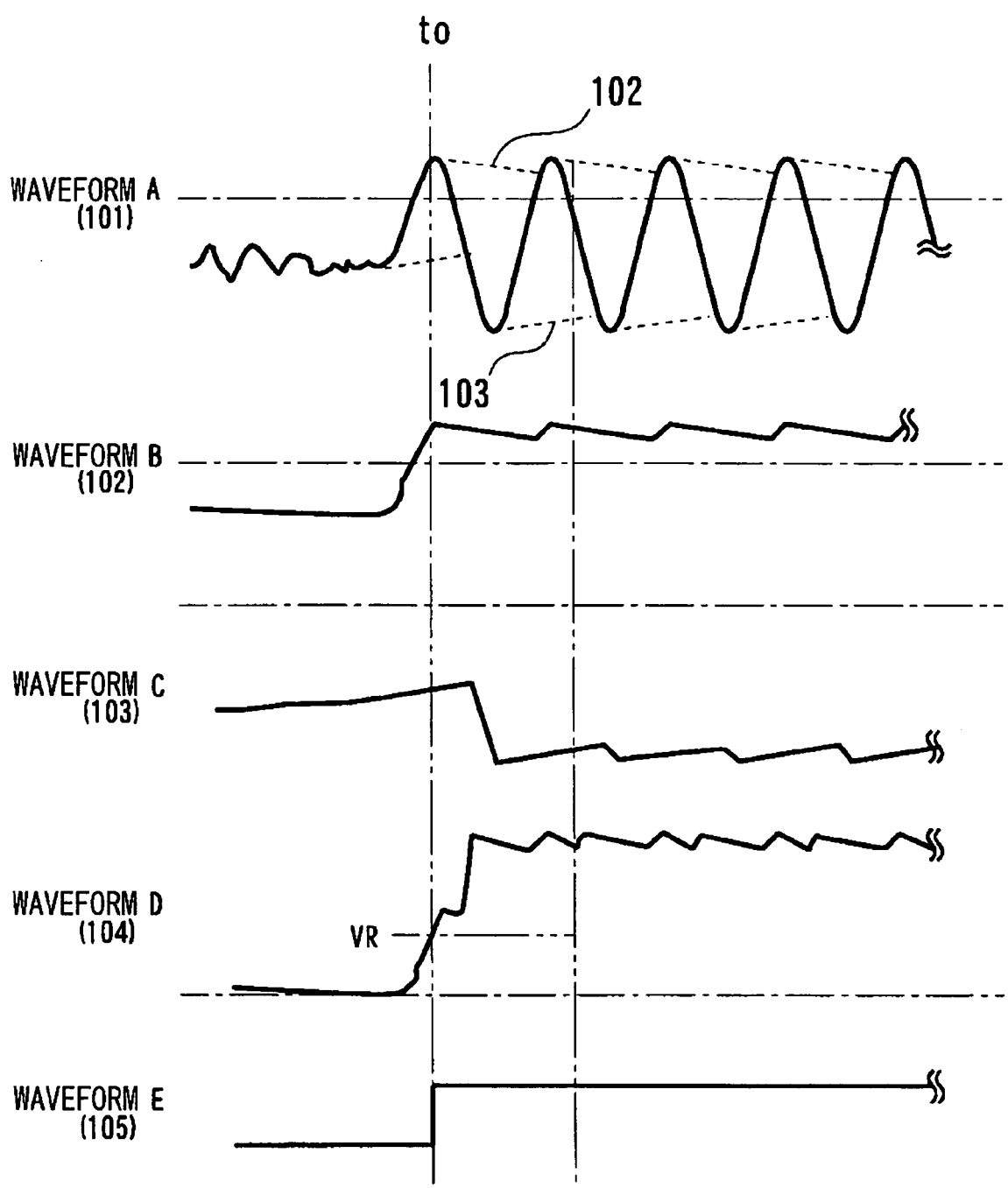
FIG. 2 shows an example of the operating waveform of the embodiment of the present invention.

A typical operation of the above-described embodiment, shown in FIG. 1, is now described. FIG. 2 shows a specified example (embodiment) of signal waveforms of respective parts of the embodiment shown in FIG. 1. In FIG. 2, a waveform A stands for the tracking error signal 101 output from the tracking error detection circuit 2. In the waveform A, waveforms shown by 102 and 103, indicated by broken lines, stand for a peak signal and a bottom signal, output from the peak/bottom detection circuit 5. A waveform B stands for the peak signal 102 (peak value) output from the peak/bottom detection circuit 5. A waveform C stands for the bottom signal 103 (bottom value) output from the peak/bottom detection circuit 5. A waveform D stands for a difference signal 104 between the peak and the bottom values of the tracking error signal (output signal of the difference circuit 6). A waveform E stands for the tracking-off signal 105 output from the comparator 7.

It is noted that the waveform B of the peak signal 102 falls with a preset time constant from the peak timing of the tracking error signal 101, depending e.g. on leakage characteristics of a peak value holder (capacity). The waveform C of the bottom signal 103 rises with a preset time constant, from the bottom timing of the tracking error signal 101, depending on e.g. leakage characteristics of the bottom holder. That is, the peak/bottom hold characteristics of the peak/bottom detection circuit 5 are set to a preset time constant for reflecting transient characteristics of the tracking error signal 101, in order for the peak/bottom detection circuit 5 to detect changes in the peak/bottom values accurately. If the hold characteristics of the peak/bottom values in the peak/bottom detection circuit 5 (time constant) are too long, it becomes impossible to detect changes in the peak/bottom values accurately.

In the present embodiment, the signal level of the difference signal between the peak signal 102 (peak value) and the bottom signal 103 (bottom value) of the tracking error signal 101 is compared with the reference voltage VR to detect the tracking-off. In the process of the detection circuit 5 finding the peak and the bottom values of the tracking error signal, the noise or interferences, superposed on the tracking error signal with symmetrical polarities, are canceled, that is, in-phase components are removed. This avoids erroneous detection of the tracking-off ascribable to noise or interferences superposed on the tracking error signal.

Moreover, in the present embodiment, DC offset component is canceled in the process of finding the difference signal between the peak and the bottom values of the tracking error signal 101. Hence, the tracking-off may be detected accurately even in case a negative DC offset component is contained in the tracking error signal 101. The tracking error signal 101 is of the same waveform in FIGS. 2 and 7. However, in the present embodiment, the waveform D (difference signal 104 entered to the comparator 7) is higher in signal level than the reference voltage VR, as from timing t0, while the waveform E (off-track-center signal 105) is of a high level, as from timing t0, as shown in FIG. 2. On the other hand, in the example shown in FIG. 7, a waveform H (off-track-center signal 108) is not of a high level immediately after timing t0, and remains low for the time being to then repeat alternating high and low levels in a pulsed fashion. That is, the waveform H is not fixed at a high level indicating the tracking-off.

Figure 3:
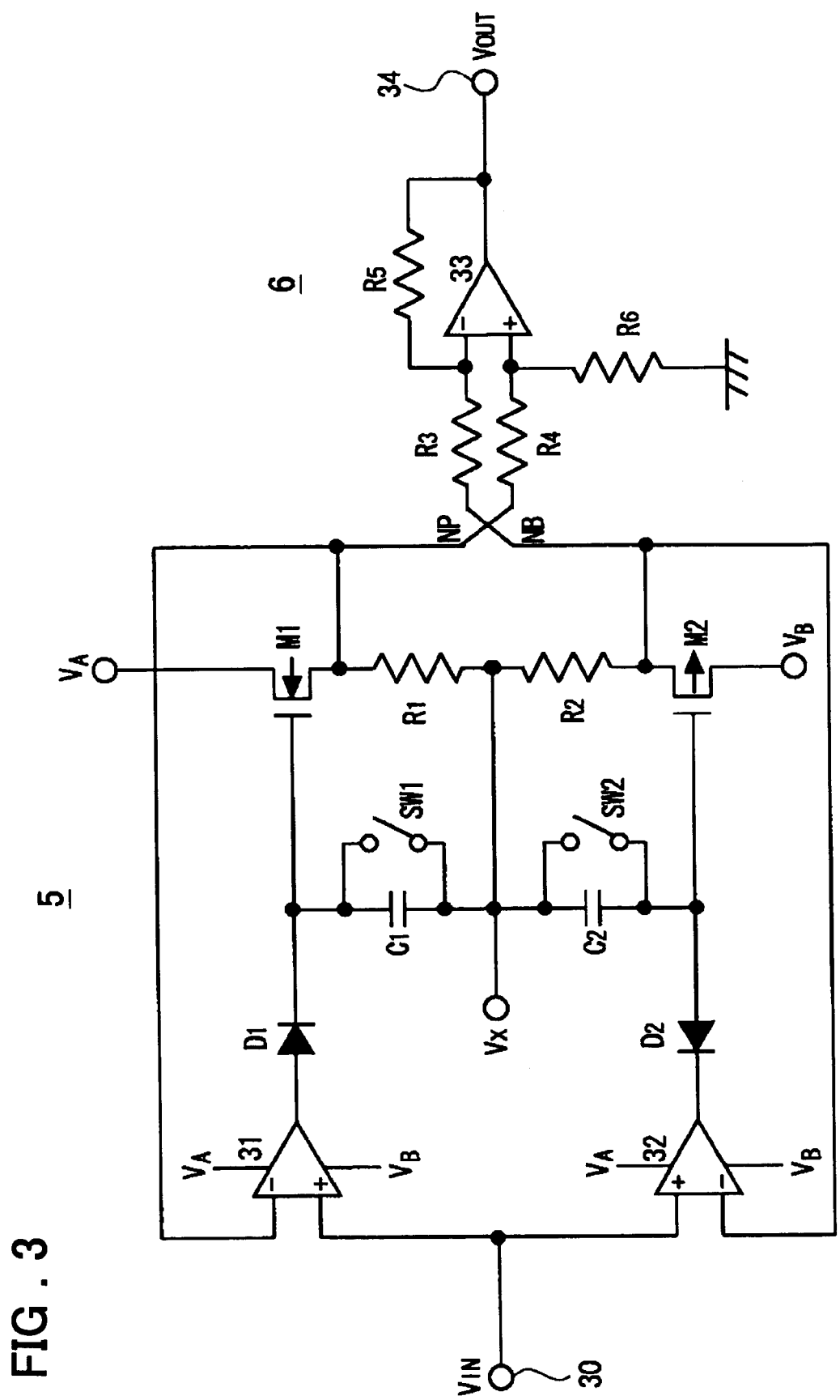
FIG. 3 is a diagram showing an illustrative configuration of a peak/bottom difference detection circuit of the embodiment of the present invention.

FIG. 3 shows an illustrative configuration of the peak/bottom difference detection circuit 10 of FIG. 1, as an embodiment of the present invention. Referring to FIG. 3, the peak/bottom difference detection circuit 10 comprises a peak/bottom detection circuit 5 and a difference circuit 6 (subtraction circuit) including a differential amplifier circuit (operational amplifier) 33.

In the above illustrative configuration, a peak value detection circuit includes a differential amplifier circuit 31, having a non-inverting input terminal (+) connected to an input terminal 30, and having an inverting input terminal (−) connected to a node NP (a node from which is output a peak hold value of an input signal VIN), a diode D1 having an anode connected to an output of the differential amplifier circuit 31, and a capacitor C1, having one end connected to the cathode of the diode D1. The peak value detection circuit also includes an NMOS transistor M1 of the source follower configuration, having a gate connected to a connection node between the cathode of the diode D1 and one end of the capacitor C1, and configured for outputting the terminal voltage of the capacitor C1 to a source, and a resistor R1, having one end connected to the source of the transistor M1.

On the other hand, a bottom value detection circuit includes a differential amplifier circuit 32, having a non-inverting input terminal (+) connected to an input terminal 30, and having an inverting input terminal (−) connected to a node NB (a node from which is output a bottom hold value of an input signal VIN), a diode D2 having a cathode connected to an output of the differential amplifier circuit 32, and a capacitor C2, having one end connected to the anode of the diode D2. The peak value detection circuit also includes a PMOS transistor M2 of the source follower configuration, having a gate connected to a connection node between the anode of the diode D2 and one end of the capacitor C2, and configured for outputting the terminal voltage of the capacitor C2 to a source, and a resistor R2, having one end connected to the source of the transistor M2. The high side power supply voltage and the low side power supply voltage of the differential amplifiers 31 and 32 are labeled VA and VB, respectively. The drain of the transistor MI is connected to the high side power supply voltage VA, the drain of the transistor M2 is connected to the low side power supply voltage VB, the opposite side ends of the capacitors C1 and C2 are connected together, the opposite side ends of the resistors R1 and R2 are connected to each other, to a connection node between the capacitors C1 and C2 and to a potential Vx. In case the power supply voltages VA and VB are positive and negative power supply voltages of equal magnitude and opposite polarities, such as +5V and −5V, respectively, Vx is the grounding voltage GND. Meanwhile, it is sufficient if the tracking error signal 101 is within the range from VA and VB. In case the tracking error signal 101 is non-negative, the voltage VB may be the ground potential. Switches SW1 and SW2, connected in parallel to the capacitors C1 and C2, are capacitors for resetting and are used at the initializing time for resetting the terminal voltages of the capacitors C1 and C2. A peak value of the voltage at the input terminal 30 is held in the capacitor C1 and output to the node NP, whilst a bottom value of the voltage at the input terminal 30 is held in the capacitor C2 and output to the node NB.

The difference circuit 6 is a subtraction circuit employing a differential amplifier circuit (operational amplifier) 33. More specifically, the differential amplifier circuit 33 has an inverting input terminal (−) connected to the node NB via resistor R3, while having a non-inverting input terminal (+) connected to the node NA via resistor R4. A feedback resistor R5 is connected across an output terminal 34 and the inverting input terminal (−), while the non-inverting input terminal (+) is connected to the ground via resistor R6. Supposing that the voltages at the nodes NA and NB are Vpeak and Vbottom, respectively, and the resistance of the resistors R3 to R6 is the same resistance R, an output voltage VOUT of the output terminal 34 is given by $$VOUT = -(VBottom - VPeak) = VPeak - VBottom.$$

Although the configuration of the peak/bottom difference detection circuit 10 per se, shown in FIG. 3, is well-known, the capacitance values of the capacitors C1 and C2 and leakage characteristics thereof in the present embodiment are set so as to cope with variations and transient characteristics of the tracking error signal 101, so that the peak and the bottom values holding characteristics will be the signal waveforms 102 and 103 shown in FIG. 2 (see the broken lines of the waveform A). The reason is that, if the holding characteristics for the peak and the bottom values remain constant for plural periods of the tracking error signal 101, the tracking errors cease to be correctable correctly. It is of course possible to variably set the capacitance values as well as the holding characteristics of the capacitors C1 and C2.

The circuit configuration, shown in FIG. 3, according to the present invention, is merely exemplary, such that any other suitable configuration may, of course, be used insofar as the circuit used allows for detection of the peak/bottom difference value. Although the peak/bottom difference detection circuit 10 is configured as an analog circuit in the above-described embodiment, it is of course possible to convert analog signals into corresponding digital signals and to use a digital circuit. An embodiment of the present invention in which the peak/bottom difference detection circuit 10 is configured as a digital circuit is now explained as a second embodiment.

Figure 4:
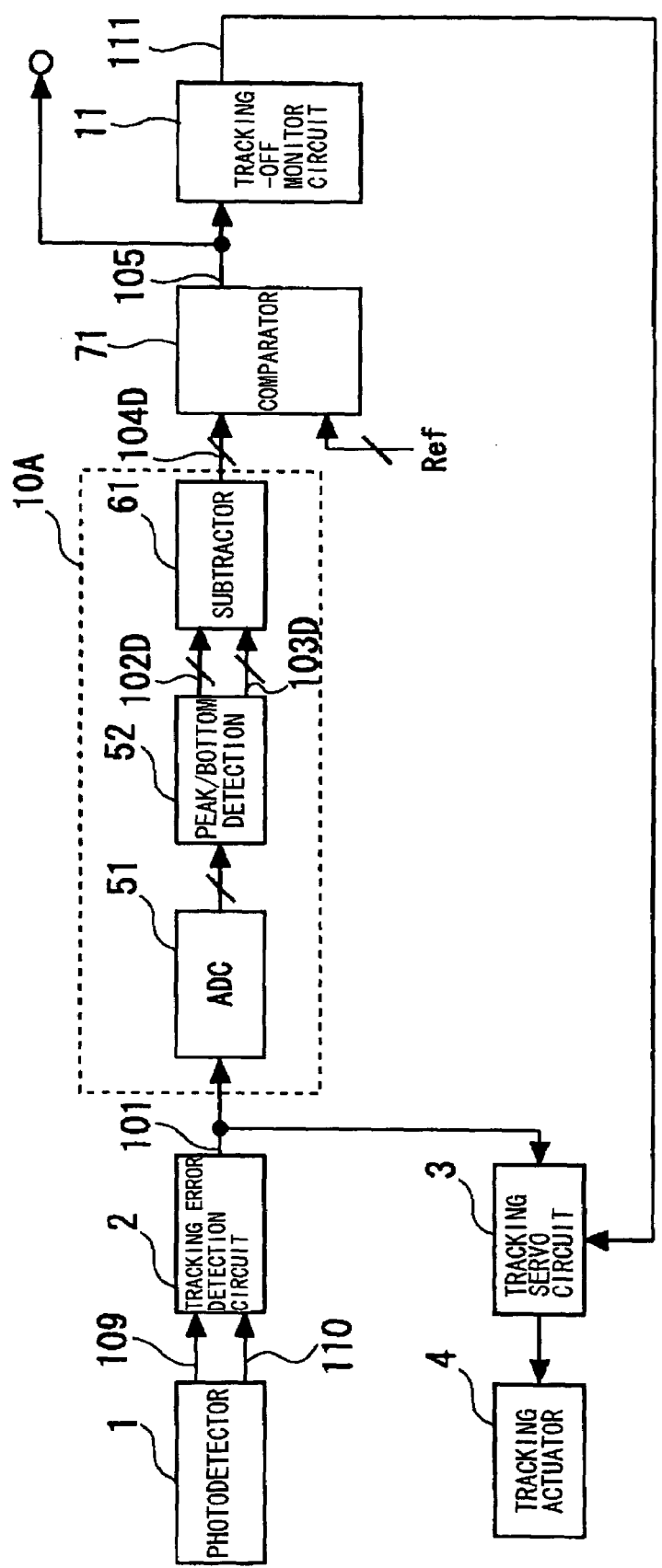
FIG. 4 is a diagram showing the configuration of a modification of the present invention.

FIG. 4 depicts the configuration of the second embodiment of the present invention. In the present embodiment, the peak/bottom difference detection circuit 10 is configured as a peak/bottom difference detection circuit 10A of a digital configuration, and there is additionally provided a monitor circuit 11 for monitoring a tracking-off.

Referring to FIG. 4, the peak/bottom difference detection circuit 10A of the second embodiment of the present invention includes an analog-to-digital converter circuit 51, a peak/bottom detection circuit 52 and a subtractor 61. The analog-to-digital converter circuit 51 samples the tracking error signal 101, output from the tracking error detection circuit 2, at a preset clock period, to convert the analog signal into a digital signal. The peak/bottom detection circuit 52 includes a buffer for storage of a number of samples for a preset period of the digital signal (digital signal with a preset bit width) from the analog-to-digital converter circuit 51, and detects a peak value (MAX) 102D and a bottom value (MIN) 103D from the digital signal sequence stored in the buffer to update the peak value (MAX) 102D and the bottom value (MIN) for the previous set of samples. The subtractor 61 calculates the difference between the peak value 102D and the bottom value 103D. An output signal (digital signal) 104D of the subtractor 61 is input to a comparator 71 (magnitude comparator) where it is compared with a reference value Ref. In case the output signal 104D of the subtractor 61 is larger than the reference value Ref, the tracking-off signal 105 is set to a high level.

A tracking-off monitor circuit 11 includes a counter (monitor timer), enabled for counting in case an input off-track-center signal 105 is active (e.g. at a high level) to count an input clock signal. The counter has its count value reset in case the tracking-off signal 105 is inactive (at a low level) and is set to a count disable state. In case the tracking-off signal 105 is at a high level for a preset time of the order e.g. of hundreds of ms on end, the counter overflows, such that an overflow signal is output as a control signal 111.

Alternatively, the tracking-off monitor circuit 11 may, of course, be configured as an analog circuit. For example, the tracking-off monitor circuit may include a charge pump circuit, discharged and reset during the low level period of the tracking-off signal 105 and charging the capacitor with a constant current during the high level period of the tracking-off signal 105, and a comparator for comparing the output voltage of the charge pump circuit with a preset threshold voltage to output the result of comparison as a control signal 111. The tracking-off monitor circuit exercises control so that, when the high level period of the tracking-off signal 105 has continued e.g. for a period of the order of hundreds of ms, such that the output voltage of the charge pump has exceeded a preset threshold voltage, the control signal 111 is activated, such that the control of the tracking servo circuit 3 is inactivated. When the tracking servo circuit 3 is inactivated, an output of the tracking servo circuit 3 is also inactivated, such that the tracking actuator 4 does not control the light beam spot position.

With the present embodiment, provided with the tracking-off monitor circuit 11, it is possible to avoid heating of the tracking actuator 4 even in case a tracking-off should persist continuously.

The operation and the result of the above-described embodiment is now explained.

With the present embodiment, in which a tracking-off is detected based on the difference between the peak and the bottom values, a tracking-off may be detected correctly, without being affected by the DC offset components of the tracking error signal.

With the present embodiment, tracking servo control is discontinued in case a tracking-off should persist for a preset time period, thereby contributing to the safety and long useful life of the apparatus. That is, in case of occurrence of the malfunctions due to heating of the tracking actuator 4, it takes considerable time until the malfunction is remedied, such that the optical disc device cannot be used during the remedying time. The non-usable period becomes longer in case components need to be exchanged. According to the present invention, it is possible to prevent the occurrence of troubles, such as heating of the tracking actuator 4 due to a tracking-off.

Although the present invention has so far been explained with reference to preferred embodiments thereof, it is to be noted that the present invention is not limited to the embodiments described and may encompass various modifications or correction that may readily be envisaged by those skilled in the art without departing from the scope of the invention as defined in the claims, It should be noted that other objects, features and aspects of the present invention will become apparent in the entire disclosure and that modifications from the disclosed embodiments may be done without departing the scope of the present invention claimed as appended herewith.

Also it should be noted that any combination of the disclosed and/or claimed elements, matters and/or items may fall under the modifications aforementioned.

What is claimed is:

1. An optical disc apparatus comprising:
   a circuit receiving a tracking error signal while controlling tracking servo control, the tracking error signal indicating a position error with respect to a track of a light beam spot focused on an optical disc, to find the difference between a peak value and a bottom value of said tracking error signal; and
   a circuit for comparing the difference between said peak and bottom values with a preset reference value to detect a tracking-off based on the result of comparison.

2. An optical disc apparatus comprising:
   a circuit receiving a tracking error signal indicating a position error with respect to a track of a light beam focused on an optical disc to find the difference a peak value and a bottom value of said tracking error signal;
   a circuit for comparing the difference between said peak and bottom values with a preset reference value to detect a tracking-off based on the of comparison; and
   a circuit for managing control for discontinuing tracking servo control in case said tracking-off persists for a preset time duration.

3. An optical disc apparatus for managing tracking position control for a light beam spot with respect to a track arranged on a disc as an optical information recording medium to effect information recording and/or replaying, comprising:
   a tracking error detection circuit for detecting a tracking error signal while controlling tracking servo control, the tracking error signal indicating a position error of said light beam spot with respect to said track;
   a detection circuit for receiving said tracking error signal output from said tracking error detection circuit to detect the peak and the bottom values of said tracking error signal;
   a difference circuit for finding the difference between said peak value and the bottom value from said detection circuit; and
   a comparator for comparing an output voltage of said difference circuit with a preset reference level to activate a tracking-off signal in case of an output level of said difference circuit exceeding said reference level.

4. An optical disc apparatus for managing tracking position control for a light beam spot with respect to a track arranged on a disc as an optical information recording medium to effect information recording and/or replaying, comprising:
   a tracking error detection circuit for detecting and outputting a tracking error signal while controlling tracking servo control, the tracking error signal indicating a position error of said light beam spot with respect to said track;
   an analog-to-digital converter circuit for sampling an analog time-continuous tracking error signal, output from said tracking error detection circuit, converting the sampled signal to a digital signal and outputting the resulting digital signal;
   a peak/bottom detection circuit for detecting a peak value and a bottom value of sampled digital signal sequence output from said analog-to-digital converter circuit for a preset time period;
   a subtractor for finding the difference between the peak and the bottom values from said peak/bottom detection circuit; and a comparator for comparing an output value of said subtractor with a preset reference value to activate a tracking-off signal in case of an output level of said subtractor exceeding said reference voltage.

5. An optical disc apparatus for managing tracking position control for a light beam spot with respect to a track arranged on a disc as an optical information recording medium to effect information recording and/or replaying comprising:

a tracking detection circuit for detecting a tracking error signal indicating a position error of said light beam snot with respect to said track;

a detection circuit for receiving said tracking error signal output from said tracking error detection circuit to detect the peak and the bottom values of said error signal;

a difference circuit for finding the difference between said peak value and the bottom value from said detection circuit;

a comparator for comparing an output voltage of said difference circuit with preset reference level to activate a tracking-off signal in case of an output level of said difference circuit exceeding said reference level;

a tracking actuator for driving-controlling the position of said light beam spot with respect to said track;

a tracking servo circuit supplied with said tracking actuator based on said tracking error signal output from said tracking error detection circuit to control the driving of said tracking actuator based on said tracking error signal; and a monitor circuit for monitoring said off-track-center signal and for managing control for halting said tracking actuator by said tracking servo circuit in case of detection of an activated state of said off-track-center signal continuing for a preset time.

6. An optical disc apparatus for managing tracking position control for a light beam spot with respect to a track arranged on a disc as an optical information recording medium to effect information recording and/or replaying comprising:

a tracking, error detection circuit for detecting and outputting a tracking error signal while controlling tracking servo control the tracking error signal indicating a position error of said light beam spot with respect to said track;

an analog-to-digital converter circuit for sampling an analog time-continuous tracking error signal, output from said tracking error detection circuit, converting the sampled signal to a digital signal and outputting the resulting digital signal;

a peak/bottom detection circuit for detecting a peak value and a bottom value of sampled digital signal sequence output from said analog to-digital converter circuit for a preset time period;

a subtractor for finding the difference between the peak and the bottom values from said peak/bottom detection circuit;

a comparator for comparing an output value of said subtractor with a preset reference value to activate a tracking off signal in case of an output level of said subtractor exceeding said reference voltage;

a tracking actuator for driving-controlling the position of said light beam spot with respect to said track;

a tracking servo circuit supplied with said tracking error signal output from said tracking error detection circuit to control the driving of said tracking actuator based on said tracking error signal; and a monitor circuit for monitoring said off-track-center signal and for managing control for halting said tracking actuator by said tracking servo circuit in case of detection of an activated state of said off-track-center signal continuing for a preset time.

7. A tracking controlling method for an optical disc apparatus comprising:

finding the difference between a peak value and a bottom value of a tracking error signal while controlling tracking servo control, the tracking error signal indicating a position error of a light beam spot focused on an optical disc with respect to a track; and comparing a difference signal between said peak and bottom values with a preset reference value to detect a tracking-off based on the results of comparison.

8. A tracking controlling method for an optical disc apparatus comprising:

finding the difference between a peak value and a bottom value of a tracking error signal indicating a position error of a light beam spot focused on an optical disc with respect to a track;

comparing a difference signal between said peak and bottom values with a preset reference value to detect a tracking-off based on the results of comparison; and managing control for halting the tracking servo control in case of said tracking-off continuing for a preset time duration.

* * * * *